United States Patent
Kovach et al.

(10) Patent No.: US 11,039,563 B2
(45) Date of Patent: Jun. 22, 2021

(54) SYSTEM FOR MONITORING THE CONDITION OF A SEEDBED WITHIN A FIELD WITH A SEEDBED FLOOR DETECTION ASSEMBLY

(71) Applicant: CNH Industrial America LLC, New Holland, PA (US)

(72) Inventors: Michael G. Kovach, Morton, IL (US); Rick L. Gerber, Roanoke, IL (US)

(73) Assignee: CNH Industrial America LLC, New Holland, PA (US)

( * ) Notice: Subject to any disclaimer, the term of this patent is extended or adjusted under 35 U.S.C. 154(b) by 222 days.

(21) Appl. No.: 16/245,387

(22) Filed: Jan. 11, 2019

(65) Prior Publication Data
US 2020/0221627 A1 Jul. 16, 2020

(51) Int. Cl.
*A01B 63/111* (2006.01)
*A01B 79/02* (2006.01)
(Continued)

(52) U.S. Cl.
CPC ......... *A01B 63/1117* (2013.01); *A01B 63/114* (2013.01); *A01B 63/1112* (2013.01);
(Continued)

(58) Field of Classification Search
CPC ... A01B 63/1117; A01B 63/111; A01B 63/10; A01B 63/02; A01B 63/00; A01B 63/112;
(Continued)

(56) References Cited

U.S. PATENT DOCUMENTS

| | | | |
|---|---|---|---|
| 4,145,980 A | 3/1979 | Boots | |
| 5,402,740 A | 4/1995 | Kinoshita et al. | |

(Continued)

FOREIGN PATENT DOCUMENTS

| | | |
|---|---|---|
| JP | H02124002 A | 5/1990 |
| JP | H02154602 A | 6/1990 |
| WO | WO 2017158006 | 9/2017 |

OTHER PUBLICATIONS

AFS Soil Command Delivers Real-Time Seedbed Quality Feedback, Case IH, http://blog.caseih.com/afs-soil-command-delivers-real-time-seedbed-quality-feedback/, Feb. 16, 2018, 2 pages.

(Continued)

*Primary Examiner* — Christopher J. Novosad
(74) *Attorney, Agent, or Firm* — Rebecca L. Henkel; Rickard K. De Mille

(57) ABSTRACT

In one aspect, a system for monitoring the condition of seedbed within a field may include a plurality of ground-penetrating tools supported by an implement frame adjacent to its forward end. The system may also include a plurality of surface-finishing tools supported by the implement frame adjacent to its aft end. Moreover, the system may include a seedbed floor detection assembly coupled to the implement frame behind the plurality of ground-penetrating tools and in front of the plurality of surface-finishing tools. The seedbed floor detection assembly may include a seedbed tool configured to ride along the seedbed floor. Additionally, the seedbed detection assembly may include a seedbed floor sensor configured to detect a position of the seedbed tool relative to the implement frame, with such position being indicative of variations in a profile of the seedbed floor.

20 Claims, 5 Drawing Sheets

(51) Int. Cl.
 *A01B 63/114* (2006.01)
 *A01B 79/00* (2006.01)
(52) U.S. Cl.
 CPC ........ *A01B 63/1115* (2013.01); *A01B 79/005* (2013.01); *A01B 79/02* (2013.01)
(58) Field of Classification Search
 CPC . A01B 63/1115; A01B 63/114; A01B 79/005; A01B 79/00; A01B 79/02
 See application file for complete search history.

(56) References Cited

U.S. PATENT DOCUMENTS

| | | | |
|---|---|---|---|
| 8,827,001 | B2 | 9/2014 | Wendte et al. |
| 8,909,436 | B2 | 12/2014 | Achen et al. |
| 9,675,004 | B2 | 6/2017 | Landphair et al. |
| 10,080,323 | B2 | 9/2018 | Lund et al. |
| 2018/0120133 | A1 | 5/2018 | Blank et al. |
| 2018/0184575 | A1 | 7/2018 | Oliver |
| 2018/0220577 | A1 | 8/2018 | Posselius et al. |
| 2018/0279541 | A1 | 10/2018 | Kovach |
| 2018/0279543 | A1 | 10/2018 | Kovach |

OTHER PUBLICATIONS

Case Rolls Out a Variety of New Equipment and Technology, Farm Journal Media, https://dialog.proquest.com/professional/docview/2021627549?accountid=157282 , Mar. 2018.

Fawcett, Tony, Case IH on Track to Deliver Driverless Tractors, The Weekly Times (Melbourne, Vic), https://dialog.proquest.com/professional/docview/2008386990?accountid=157282, Feb. 28, 2018.

Jensen, T et al., Assessing the Effect of the Seedbed Cultivator Leveling Tines on Soil Surface Properties Using Laser Range Scanners, Soil and Tillage Research, https://dialog.proquest.com/professional/docview/1849019031?accountid=157282, Apr. 1, 2017.

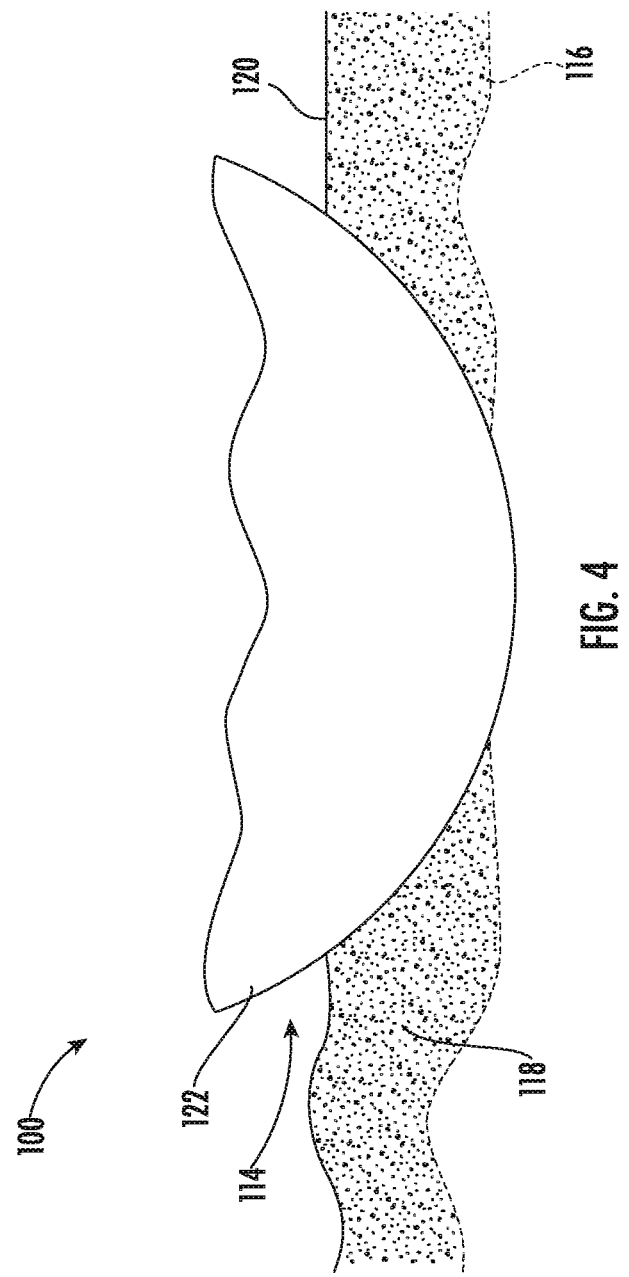

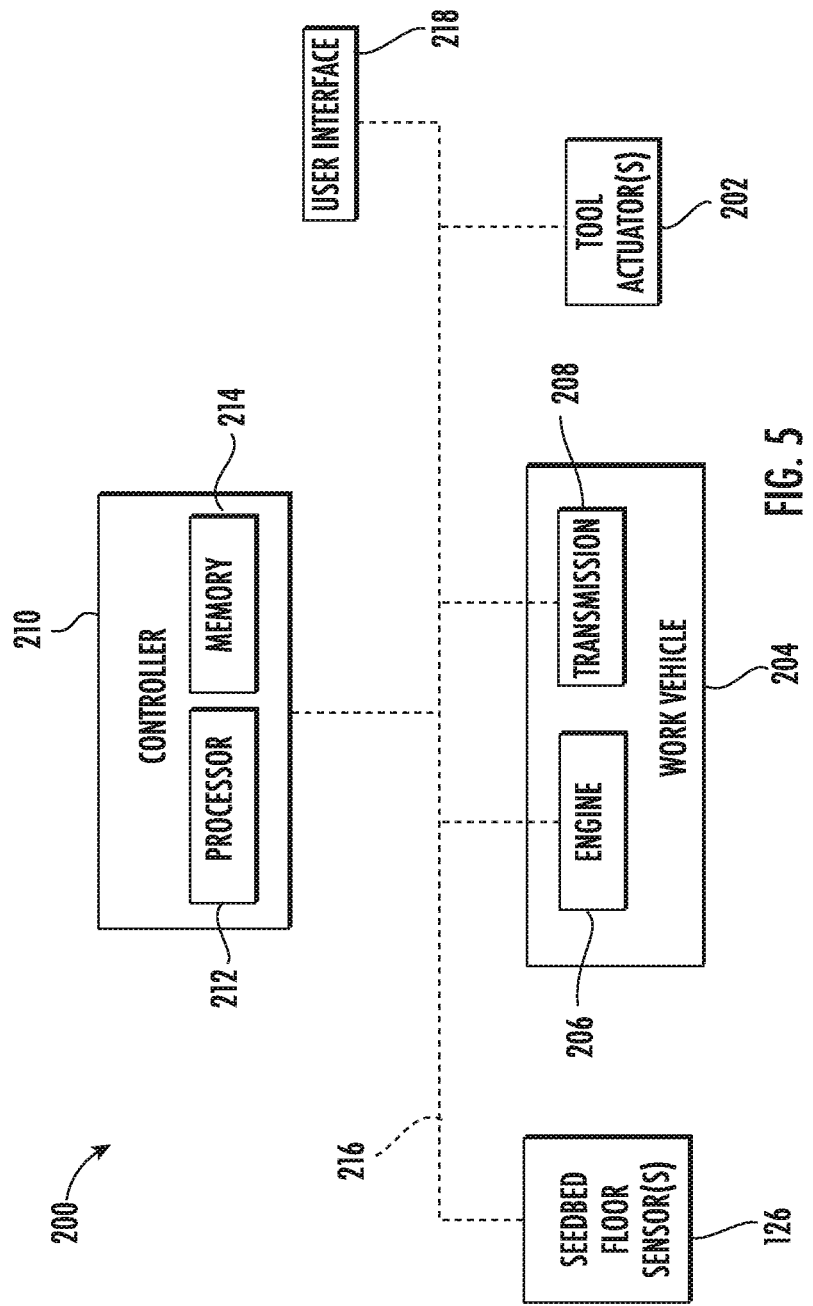

SYSTEM FOR MONITORING THE CONDITION OF A SEEDBED WITHIN A FIELD WITH A SEEDBED FLOOR DETECTION ASSEMBLY

FIELD OF THE INVENTION

The present disclosure generally relates to systems for monitoring the condition of a seedbed within a field when performing field operations (e.g., tillage operations) and, more particularly, to a system for determining a profile(s) of the seedbed floor created or traversed across by an agricultural implement during the performance of a field operation.

BACKGROUND OF THE INVENTION

It is well known that, to attain the best agricultural performance from a piece of land, a farmer must cultivate the soil, typically through a tillage operation. Common tillage operations include plowing, harrowing, and sub-soiling. Modern farmers perform these tillage operations by pulling a tillage implement behind an agricultural work vehicle, such as a tractor. Depending on the crop selection and the soil conditions, a farmer may need to perform several tillage operations at different times over a crop cycle to properly cultivate the land to suit the crop choice.

When performing a tillage operation, it is desirable to create a level and uniform layer of tilled soil across the field to form a proper seedbed for subsequent planting operations. However, due to varying soil conditions across the field and/or other factors, the levelness and/or uniformity of the seedbed may be impacted significantly. Such poor seedbed conditions can result in a subsequent loss in the crop yield, such as due to poor germination and/or non-uniform plant stands. In this regard, systems to monitor the condition of the seedbed created during a tillage operation have been developed. However, further improvements to such systems are needed.

Accordingly, an improved system for monitoring seedbed conditions would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for monitoring the condition of seedbed within a field. The system may include an implement frame extending along a longitudinal direction between a forward end and an aft end. The system may also include a plurality of ground-penetrating tools supported by the implement frame adjacent to the forward end, with the plurality of ground penetrating tools configured to create or be moved through a seedbed extending downwardly within the field from an outer seedbed surface to a seedbed floor. Furthermore, the system may include a plurality of surface-finishing tools supported by the implement frame adjacent to the aft end, with the plurality of surface-finishing tools configured to be moved along the outer seedbed surface. Moreover, the system may include a first seedbed floor detection assembly coupled to the implement frame such that the first seedbed floor detection assembly is located behind the plurality of ground-penetrating tools and in front of the plurality of surface-finishing tools relative to a forward travel of direction of the implement frame. The first seedbed floor detection assembly may include a seedbed tool configured to ride along the seedbed floor as the implement frame is moved across the field in the forward travel direction. Additionally, the first seedbed detection assembly may include a seedbed floor sensor configured to detect a position of the seedbed tool relative to the implement frame. The position of the seedbed may be indicative of a first profile of the seedbed floor as the seedbed tool rides along the seedbed floor with movement of the implement frame in the forward travel direction.

In another aspect, the present subject matter is directed to an agricultural implement. The agricultural implement may include a frame extending along a longitudinal direction between a forward end and an aft end. The agricultural implement may also include a plurality of ground-penetrating tools supported by the frame adjacent to the forward end, with the plurality of ground penetrating tools configured to create or be moved through a seedbed extending downwardly within the field from an outer seedbed surface to a seedbed floor. Furthermore, the agricultural implement may include a plurality of surface-finishing tools supported by the frame adjacent to the aft end, with the plurality of surface-finishing tools configured to be moved along the outer seedbed surface. Moreover, the agricultural implement may include a first seedbed floor detection assembly coupled to the frame such that the first seedbed floor detection assembly is located behind the plurality of ground-penetrating tools and in front of the plurality of surface-finishing tools relative to a forward travel of direction of the implement. The first seedbed floor detection assembly include a seedbed tool configured to ride along the seedbed floor as the implement is moved across the field in the forward travel direction. Additionally, the first seedbed floor detection tool may also include a seedbed floor sensor configured to detect a position of the seedbed tool relative to the frame. The position of the seedbed tool may be indicative of a first profile of the seedbed floor as the seedbed tool rides along the seedbed floor with movement of the implement in the forward travel direction.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 4 illustrates a simplified view of a ground-engaging portion of the seedbed floor detection assembly shown in FIG. 3 positioned relative to a floor and an outer surface of a seedbed directly behind an implement following the performance of a field operation; and FIG. 5 illustrates a schematic view of one embodiment of a system for monitoring the condition of a seedbed within a field in accordance with aspects of the present subject matter.

Figure 1:
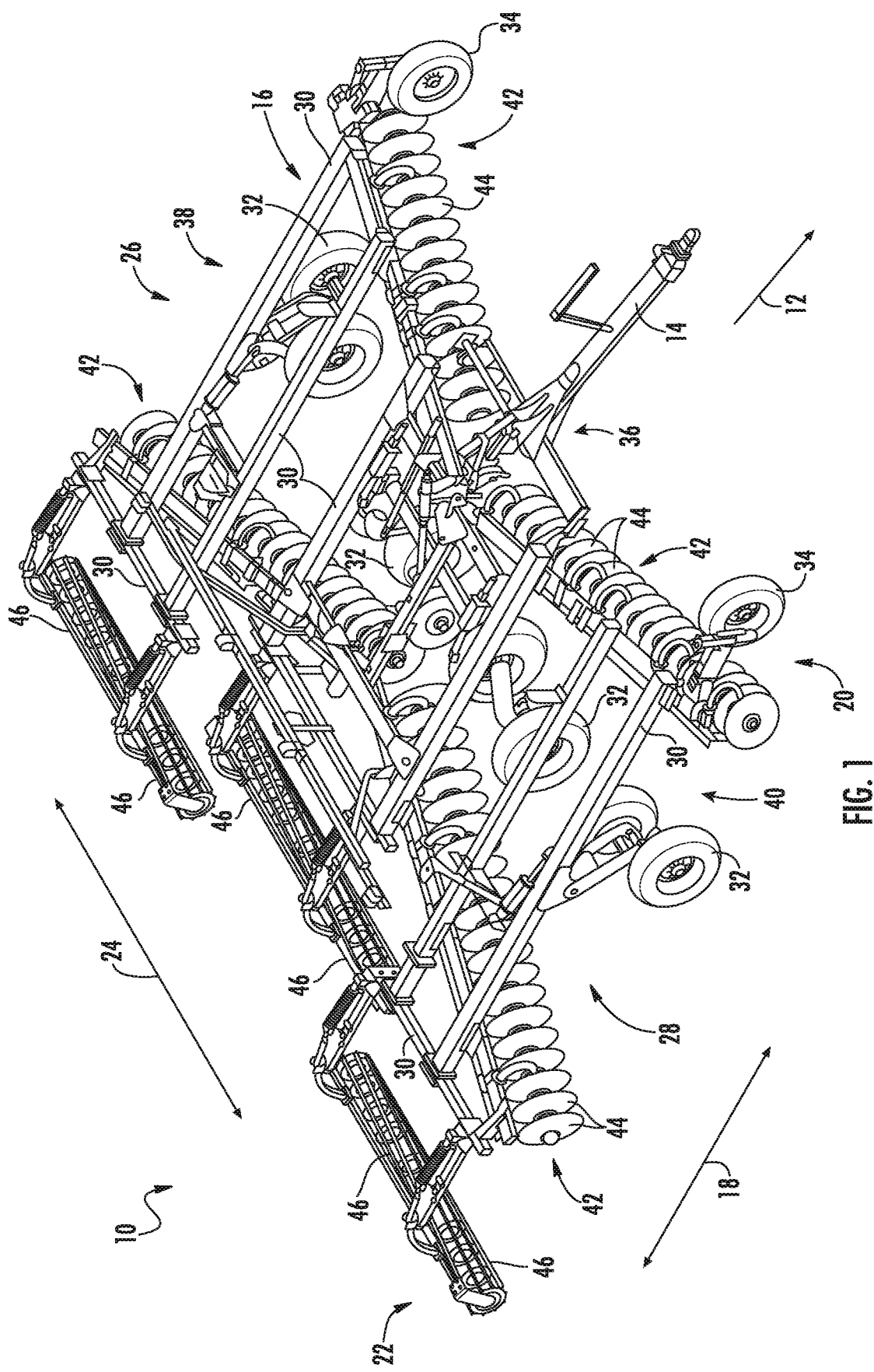
FIG. 1 illustrates a perspective view of one embodiment of an agricultural implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system for monitoring the condition of a seedbed created during the performance of a field operation, such as a tillage operation. Specifically, in several embodiments, one or more seedbed floor detection assemblies may be coupled to a frame of an agricultural implement at a position(s) located aft of a plurality of ground-penetrating tools (e.g., disc blades) mounted adjacent to a forward end of the frame. Furthermore, the seedbed detection assembly(ies) may be coupled to the frame at a position(s) located forward of a plurality of surface-finishing tools (e.g., baskets) mounted adjacent to an aft end of the frame. As such, the seedbed floor detection assembly(ies) may be used to monitor the condition(s) of the seedbed behind the ground-penetrating tools and in front of the surface-finishing tools. For instance, the seedbed floor detection assembly(ies) may be configured to detect a vertical profile(s) of the seedbed floor as the implement is moved across the field. Based on the detected profile(s), a controller of the system may be configured to initiate a control action (e.g., by adjusting an operating parameter of the implement) to account for the profile(s), thereby allowing a more uniform and level seedbed to be created as the field operation is being performed.

The present subject matter will generally be described herein in the context of monitoring seedbed conditions when performing a tillage operation using a tillage implement, such as a disc harrow. However, it should be appreciated that the disclosed system and method may also be used to monitor seedbed conditions within a field when performing any other suitable type of field operation, such as fertilizing, planting, and/or the like. Additionally, it should be appreciated that the disclosed system components may be provided in operative association with any suitable agricultural implement configured to perform a field operation, such as cultivators, disk harrows, planters, fertilizers, chisels, and/or the like.

Figure 2:
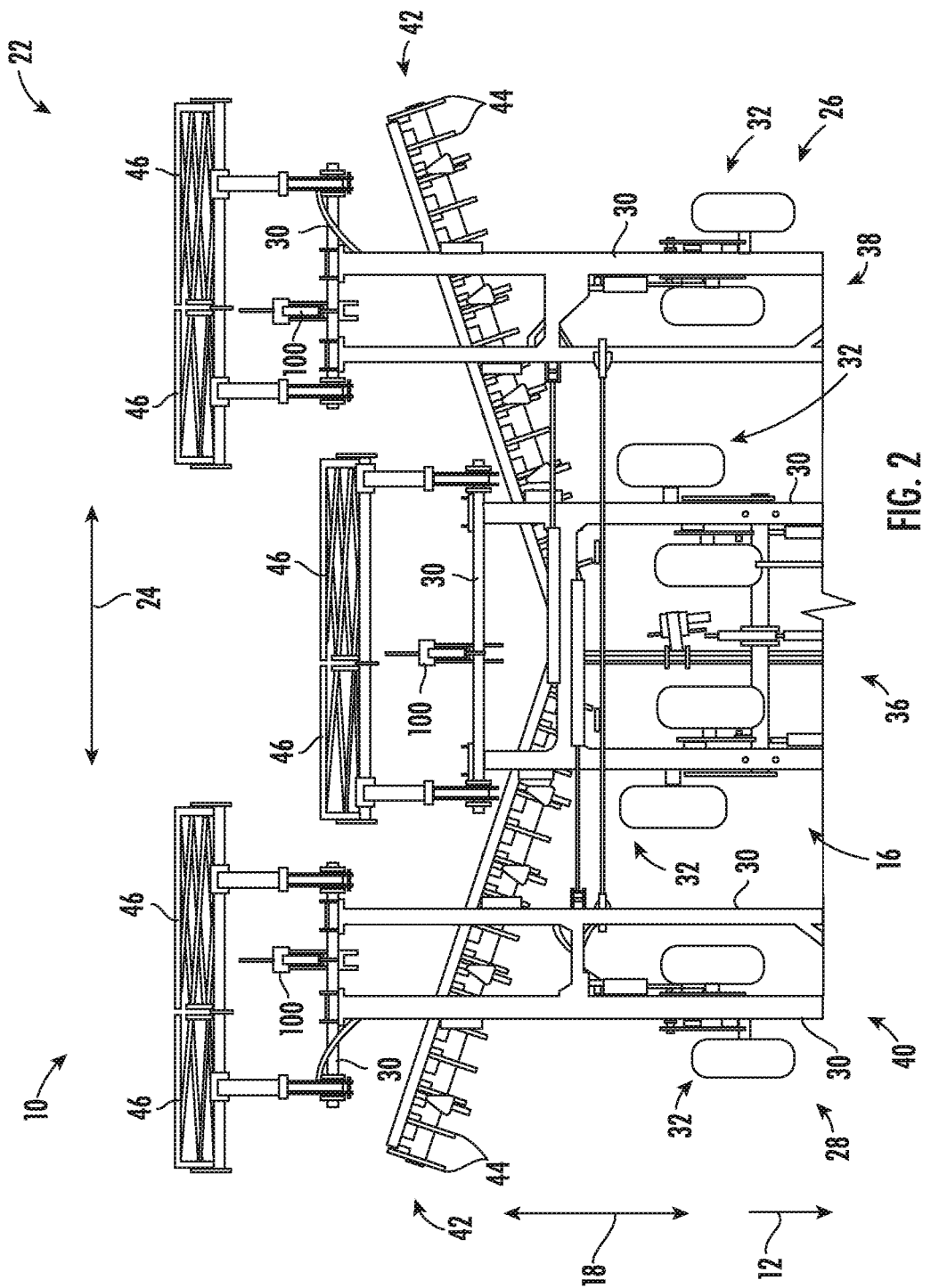
FIG. 2 illustrates a partial top view of the agricultural implement shown in FIG. 1, particularly illustrating a plurality of seedbed floor detection assemblies mounted on the implement.

Referring now to the drawings, FIGS. 1 and 2 illustrate differing views of one embodiment of an agricultural implement 10 in accordance with aspects of the present subject matter. Specifically, FIG. 1 illustrates a perspective view of the agricultural implement 10, particularly illustrating various components of the implement 10. Additionally, FIG. 2 illustrates a partial top view of the implement 10, particularly illustrating a plurality of seedbed floor detection assemblies 100 mounted on the implement 10.

In general, the implement 10 may be configured to be towed along a forward direction of travel 12 by a work vehicle (not shown), such as a tractor or other agricultural work vehicle. For example, the work vehicle may be coupled to the implement 10 via a hitch assembly 14 or using any other suitable attachments means. As shown, the hitch assembly 14 may be coupled to a frame 16 of the implement 10 to facilitate towing the implement 10 in the direction of travel 12.

As shown, the frame 16 may extend in a longitudinal direction (e.g., as indicated by arrow 18 in FIG. 1) between a forward end 20 and an aft end 22. The frame 16 may also extend in a lateral direction (e.g., as indicated by arrow 24 in FIG. 1) between a first side 26 and a second side 28. In addition, the frame 16 may generally include a plurality of structural frame members 30, such as beams, bars, and/or the like, configured to support or couple to a plurality of components. For example, a plurality of wheel assemblies may be coupled to the frame 16, such as a plurality of centrally located wheels 32 and a plurality of front pivoting wheels 34, to facilitate towing the implement 10 in the direction of travel 12.

In several embodiments, the frame 16 may include one or more sections. For example, as shown, in the illustrated embodiment, the frame 16 may include a main or center section 36 positioned centrally between the first and second sides 26, 28 of the frame 16. The frame 16 may also include a first wing section 38 positioned adjacent to the first side 26 of the frame 16. Similarly, the frame 16 may also include a second wing section 46 positioned adjacent to the second side 28 of the frame 16. The first and second wing sections 38, 40 may be pivotably coupled to the main section 36 of the frame 16. In this respect, the first and second wing sections 38, 40 may be configured to fold up relative to the main section 36 to reduce the lateral width of the implement 10 to permit, for example, storage or transportation of the implement 10 on a road. However, in other embodiments, the frame 16 may include any suitable number of frame sections.

Referring still to FIGS. 1 and 2, the implement 10 may also include a plurality of ground-penetrating tools supported by the frame 16. In general, the ground-penetrating tools may be configured to create or be moved through a seedbed extending downwardly within the field across which the implement 10 is traveling. For example, in one embodiment, the frame 16 may be configured to support one or more gangs or sets 42 of disc blades 44 at its forward end 20. In such an embodiment, each disc blade 44 may, for example, include both a concave side (not shown) and a convex side (not shown). In addition, the gangs 42 of disk blades 44 may be oriented at an angle relative to the travel direction 12 to promote more effective tilling of the soil. Although the illustrated embodiment of the implement 10 includes four gangs 42 of disc blades 44, it should be appreciated that, in alternative embodiments, the implement 10 may include any other suitable number of gangs 42 of disc blades 44.

It should be appreciated that, in addition to the gangs 42 of disc blades 44 shown in FIGS. 1 and 2 (or as an alternative thereto), the implement 10 may include any other suitable ground-penetrating tools. For instance, if the implement 10 is configured as a cultivator or ripper, the implement 10 may include a plurality of rows or ranks of ground-penetrating shanks. Similarly, if the implement 10 is configured as a planter, the implement 10 may include a plurality of opener discs and/or closer discs.

Additionally, the implement 10 may also include a plurality of surface-finishing tools supported by the frame 16. In general, the surface-finishing tools to may be configured to be moved along an outer surface of the soil in a manner that conditions of the outer soil surface. As such, in several embodiments, the surface-finishing tools may be positioned behind or aft of the ground-penetrating tools relative to the direction of travel 12 of the implement 10. For example, in one embodiment, the frame 16 may be configured to support one or more baskets or rotary firming wheels 46 adjacent to its aft end 20. The baskets 46 may, in turn, be configured to reduce the number of clods in the soil and/or firm the soil over which the implement 10 travels. In the illustrated embodiment, a pair of baskets 46 is coupled to each section 36, 38, 40 of the frame 16. However, in alternative embodiments, each section 36, 38, 40 may be include any other suitable number of baskets 46, such as a single basket 46 or three or more baskets 46. Furthermore, although the illustrated embodiment of the implement 10 includes a total of six baskets 46, it should be appreciated that, in alternative embodiments, the implement 10 may include any other suitable number of baskets 46.

Moreover, it should be appreciated that, in addition to the baskets 46 shown in FIGS. 1 and 2 (or as an alternative thereto), the implement 10 may include any other suitable surface-finishing tools. For instance, if the implement 10 is configured as a cultivator, the implement 10 include a plurality of rows harrow tines and/or leveling blades. Similarly, if the implement 10 is configured as a planter, the implement 10 may include a plurality of packer wheels.

Referring particularly to FIG. 2, the implement 10 may include one or more seedbed floor detection assemblies 100 mounted on its frame 16. In general, and as will be described below, each detection assembly 100 may be configured to capture data indicative of the profile of the seedbed floor of the field across which the implement 10 is traveling. As shown, in the illustrated embodiment, one detection assembly 100 is coupled to each section 36, 38, 40 of the frame 16. However, in alternative embodiments, each section 36, 38, 40 may include more than one detection assembly 100, such as two or more detection assemblies 100. Furthermore, in other embodiments, one or more of the sections 36, 38, 40 may not include any detection assemblies 100. In this regard, the implement 10 may include any other suitable number of detection assemblies 100 mounted on the frame 16, such as one, two, or four more detection assemblies 100.

In accordance with aspects of the present subject matter, each detection assembly 100 may be positioned aft of the ground-penetrating tools of the implement 10 and forward of the surface-finishing tools of the implement 10 relative to the direction of travel 12. Specifically, in several embodiments, each detection assembly 100 may be positioned aft of the ground-penetrating tools and forward of the surface-finishing tools that are positioned on the same section of the frame 16. For example, as shown in FIG. 2, the detection assembly 100 coupled to the center section 36 of the frame 16 may be positioned aft of the disc blades 44 mounted on the center section 36 and forward of the basket 46 mounted on the center section 36. Similarly, the detection assemblies 100 coupled to the wing sections 38, 40 of the frame 16 may be positioned forward of the disc blades 44 mounted on the such sections 38, 40 and aft of the baskets 46 mounted on such sections 38, 40. Additionally, in one embodiment, the detection assemblies 100 coupled to the wing sections 38, 40 may be aligned with each other along the longitudinal direction 18. However, in alternative embodiments, each detection assembly 100 may be positioned aft of all the ground-penetrating tools and forward of all the surface-finishing tools.

It should be appreciated that positioning each detection assembly 100 forward of the ground-penetrating tools and aft of the surface-finishing tools may provide one or more technical advantages. For example, such positioning may allow the detection assembly(ies) 100 to be positioned adjacent to the ground-penetrating tools forming the seedbed, thereby reducing the magnitude of the relative movement between the ground-penetrating tools and the detection assembly(ies) 100 and improving the accuracy of the detection assembly(ies) 100. Furthermore, as will be described below, such positioning may also allow the detection assembly(ies) 100 to be directly coupled to a frame member 30 of the frame 16, which further reduces the magnitude of the relative movement between the ground-penetrating tools and the detection assembly(ies) 100.

Furthermore, it should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
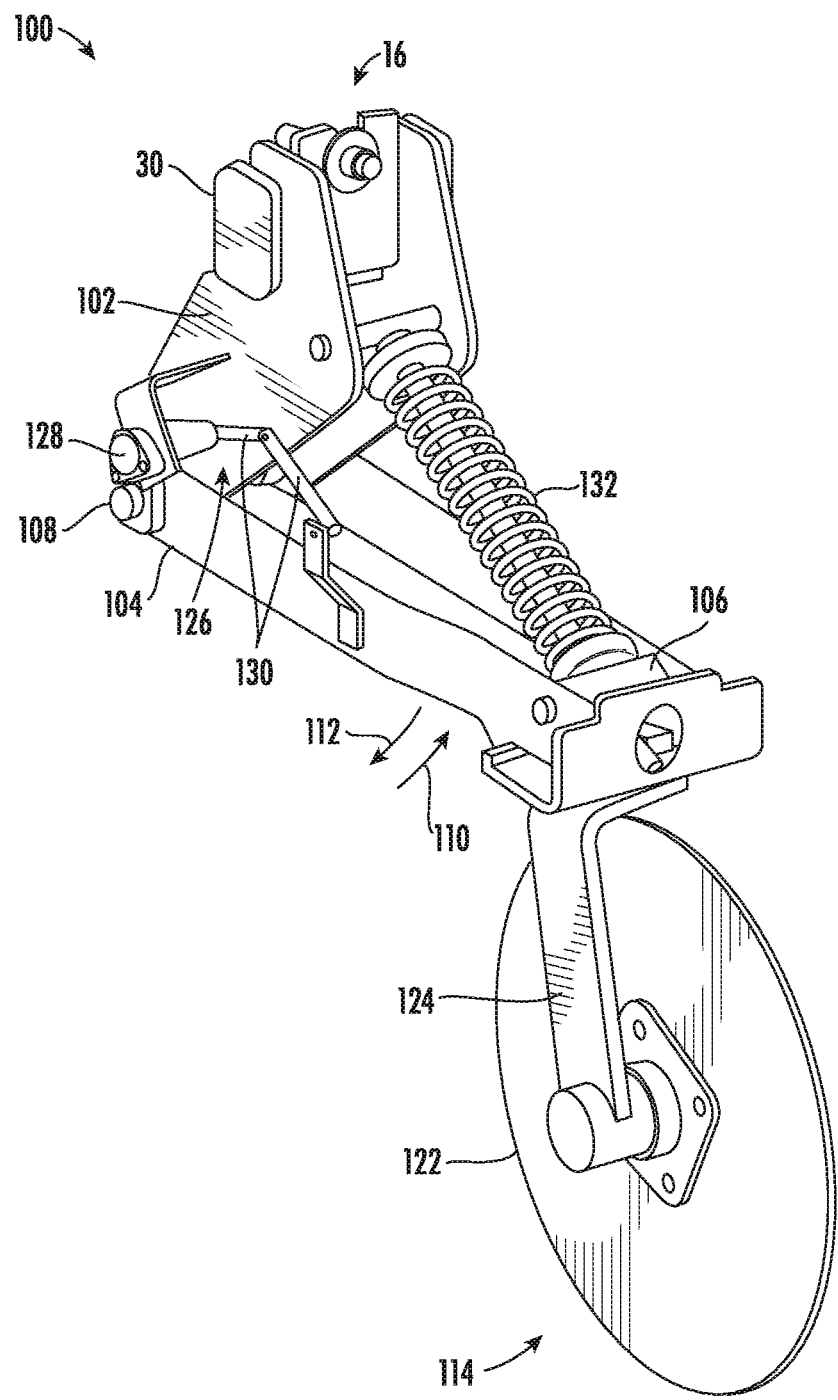
FIG. 3 illustrates a perspective view of one embodiment of a seedbed floor detection assembly in accordance with aspects of the present subject matter.

Referring now to FIG. 3, a perspective view of one embodiment of a seedbed floor detection assembly 100 for use with an agricultural implement is illustrated in accordance with aspects of the present subject matter. In general, the seedbed floor detection assembly 100 will be described herein with reference to the implement 10 described above with reference to FIGS. 1 and 2. However, it should be appreciated by those of ordinary skill in the art that the disclosed seedbed floor detection assembly 100 may generally be utilized with implements having any other suitable implement configuration.

As shown in FIG. 3, the detection assembly 100 may be supported by a portion of the frame 16, such as by coupling the detection assembly 100 to one of the frame members 30 via a bracket 102. In several embodiments, the detection assembly 100 may include one or more pivot arms (e.g., a first pivot arm 104 and a second pivot arm 106) pivotably coupled to the frame member 30 (e.g., via the bracket 102) such that the pivot arms 104, 106 are configured to pivot relative to the frame member 30. For instance, the pivot arms 104, 106 may be pivotably coupled to the frame member 30 at pivot points 108 defined between the pivot arms 104, 106 and the mounting bracket 102. As such, the pivot arms 104, 106 may pivot relative to the frame member 30 about the pivot points 108 (e.g., as indicated by arrows 110, 112 in FIG. 3).

In addition, the detection assembly 100 may include a seedbed tool 114 coupled to the pivot arms 104, 106. In general, the seedbed tool 114 may be configured to ride along or otherwise contact a floor of a seedbed created by the implement 10 as the implement 10 is being moved through the field, thereby allowing the seedbed tool 114 to follow the contour or profile of the seedbed floor. For instance, as shown in FIG. 4, the seedbed tool 114 may ride along a floor 116 of a seedbed 118 (with the seedbed 118 extending vertically between an outer seedbed surface 120 and the seedbed floor 116) as the implement 10 (and, thus, the detection assembly 100) is moved in the forward travel direction 12. Thus, as the seedbed tool 114 is moved across a portion of the seedbed floor 116 that includes vertically-oriented variations in its profile (e.g., dips or raises in the seedbed floor 116), the seedbed tool 114 may raise or lower relative to the frame member 30 as the tool 114 follows the profile of the seedbed floor 116. Such raising or lowering of the seedbed tool 114 may, in turn, result in the pivot arms 104, 106 pivoting relative to the frame member 30. For instance, as the seedbed tool 114 rises with increases in the vertical profile of the seedbed floor 116, the pivot arms 104, 106 may pivot upwardly about the pivot point 108 in a first direction (e.g., as indicated by arrow 110 in FIG. 3). Similarly, as the seedbed tool 114 lowers with reductions in the vertical profile of the seedbed floor 116, the pivot arms 104, 106 may pivot downwardly about the pivot point 108 in an opposite, second direction (e.g., as indicated by arrow 112 in FIG. 3).

In general, the seedbed tool 114 may correspond to any suitable tool and/or member configured to penetrate through the loosened soil layer forming the seedbed 118 and ride along or otherwise contact the seedbed floor 116 as the implement 10 is moved across the field. In several embodiments, the seedbed tool 114 may correspond to one or more rotary members configured to rotate or roll along the seedbed floor 116. For instance, as shown in the illustrated embodiment, the seedbed tool 114 may correspond to a rotary disc 122 (e.g., a dulled coulter disc) configured to penetrate through the loosened soil of the seedbed 118 and roll along the seedbed floor 116. In such an embodiment, the rotary disc 122 may be coupled to the pivot arms 104, 106 via a suitable support bracket 124 or other suitable mounting means to allow the rotary disc 122 to be rotationally supported relative to the seedbed floor 116. In other embodiments, the seedbed tool 114 may correspond to one or more non-rotary tools, such as a sweep or a tine, configured to penetrate through the loosened soil of the seedbed 118 and contact the seedbed floor 116 as the implement 10 is moved across the field. Furthermore, although the illustrated embodiment of the detection assembly 100 includes a single seedbed tool 114, it should be appreciated that, in alternative embodiments, the detection assembly 100 may include two or more seedbed tools 114.

Referring again to FIG. 3, the detection assembly 100 may also include a seedbed floor sensor 126 configured to detect the position of the seedbed tool 114 relative to the frame member 30 (e.g., by detecting the position of or the pivotable motion of the arms 104, 106). By detecting the position of the pivot arms 104, 106 relative to the frame member 30, the sensor 126 may be configured to indirectly detect the vertical profile of the seedbed floor 116 as the pivot arms 104, 106 pivot due to changes in the vertical positioning of the seedbed tool 114 as such tool 114 rides along the seedbed floor 116. Accordingly, the position of the pivot arms 104, 106 relative to the frame member 30 may be used to determine the vertical profile of the seedbed floor 116.

It should be appreciated that the seedbed floor sensor 126 may generally correspond to any suitable sensor or sensing device configured to directly or indirectly detect the position of the seedbed tool 114 relative to the frame member 30. In several embodiments, the seedbed floor sensor 126 may include a rotary sensor 128 (e.g., a rotary potentiometer or a magnetic rotary sensor) coupled to the bracket 102 (which is, in turn, coupled to the frame member 30) or one of the pivot arms 104, 106 and an associated sensor linkage 130 coupled between the rotary sensor 128 and the other adjacent component. For instance, as shown in the illustrated embodiment, the rotary sensor 128 is coupled to a portion of the bracket 102, with the sensor linkage 130 being coupled between the rotary sensor 128 and one of the pivot arms 104, 106. As such, the position of the pivot arms 104, 106 relative to the frame member 30 may be detected by the rotary sensor 128 via the mechanical linkage provided by the sensor linkage 130.

In other embodiments, the seedbed floor sensor 126 may correspond to any other suitable sensor or sensing device configured to detect the position of the seedbed tool 114. For instance, the seedbed floor sensor 126 may correspond to an accelerometer, a linear potentiometer, a proximity sensor, and/or any other suitable transducer (e.g., ultrasonic, electromagnetic, infrared, etc.) that allows the position of the pivot arms 104, 106 to be directly or indirectly detected. Furthermore, although the illustrated embodiment of the detection assembly 100 includes a single seedbed floor sensor 126, it should be appreciated that, in alternative embodiments, the detection assembly 100 may include two or more seedbed floor sensors 126.

As shown in FIG. 3, the detection assembly 100 may also include a biasing mechanism 132 configured to bias the seedbed tool 114 in the direction of the seedbed floor 116. For instance, as shown in the illustrated embodiment, the biasing mechanism 132 corresponds to a spring-loaded device coupled between the bracket 102 and the first and second pivot arms 104, 106, respectively. As such, the spring-loaded device may bias the pivot arms 104, 106 away from the bracket 102 and the frame member 30, thereby forcing the seedbed tool 114 downwardly in the direction of the seedbed floor 116. However, in other embodiments, the biasing mechanism 132 may correspond to any other suitable device, such as a spring, a fluid-driven cylinder, or a suitable linear actuator. Furthermore, although the illustrated embodiment of the detection assembly 100 includes a biasing mechanism, it should be appreciated that, in alternative embodiments, the detection assembly 100 may include two or more biasing mechanisms 132.

Referring now to FIG. 5, a schematic view of one embodiment of a system 200 for monitoring the condition of seedbed within a field is illustrated in accordance with aspects of the present subject matter. In general, the seedbed floor detection assembly 100 will be described herein with reference to the implement 10 and the seedbed floor detection assembly 100 described above with reference to FIGS. 1-4. However, it should be appreciated by those of ordinary skill in the art that the disclosed system 200 may generally be utilized with implements having any other suitable implement configuration and/or seedbed floor detection assemblies having any suitable assembly configuration.

As shown in FIG. 5, the system 200 may include one or more tool actuators 202 of the implement 10. Specifically, each actuator 202 may be configured to adjust to the position or orientation of a ground-penetrating tool of implement 10, such as one of the gangs 42 of disc blades 44, relative to the implement frame 16. For example, in one embodiment, a first end of each actuator 202 (e.g., a rod of each actuator 202) may be coupled to the tool, while a second end of each actuator 202 (e.g., the cylinder of each actuator 202) may be coupled to the frame 16. The rod of each actuator 202 may be configured to extend and/or retract relative to the corresponding cylinder to adjust the position or orientation of the tool relative to the frame 16. In one embodiment, the actuator(s) 202 corresponds to a fluid-driven actuator(s), such as a hydraulic or pneumatic cylinder(s). However, it should be appreciated that the actuator(s) 202 may correspond to any other suitable type of actuator(s), such as an electric linear actuator(s).

Furthermore, the system 200 may include a work vehicle 204, such as a tractor or other agricultural work vehicle, that is configured tow the implement 10 across the field in the direction of travel 12. In this regard, the vehicle 204 may include one or more devices for adjusting the speed at which the implement 10 is moved across the field. For example, the vehicle 204 may include an engine 206 and a transmission 208. In general, the engine 206 may be configured to generate power by combusting or otherwise burning a mixture of air and fuel. The transmission 208 may, in turn, be operably coupled to the engine 206 and may provide variably adjusted gear ratios for transferring the power generated by the engine 206 to wheels (not shown) and/or track assemblies (not shown) of the vehicle 204. For example, increasing the power output by the engine 206 (e.g., by increasing the fuel flow to the engine 206) and/or shifting the transmission 208 into a higher gear may increase the speed at which the implement 10 is moved across the field. Conversely, decreasing the power output by the engine 206 (e.g., by decreasing the fuel flow to the engine 206) and/or shifting the transmission 208 into a lower gear may decrease the speed at which the implement 10 is moved across the field.

In accordance with aspects of the present subject matter, the system 200 may include a controller 210 positioned on and/or within or otherwise associated with the implement 12 or vehicle 204. In general, the controller 210 may comprise any suitable processor-based device known in the art, such as a computing device or any suitable combination of computing devices. Thus, in several embodiments, the controller 210 may include one or more processor(s) 212 and associated memory device(s) 214 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 214 of the controller 210 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 214 may generally be configured to store suitable computer-readable instructions that, when implemented by the processor(s) 212, configure the controller 210 to perform various computer-implemented functions.

In addition, the controller 210 may also include various other suitable components, such as a communications circuit or module, a network interface, one or more input/output channels, a data/control bus and/or the like, to allow controller 210 to be communicatively coupled to any of the various other system components described herein (e.g., the seedbed floor sensor(s) 126, the tool actuator(s) 202, the engine 206, and/or the transmission 208). For instance, as shown in FIG. 5, a communicative link or interface 216 (e.g., a data bus) may be provided between the controller 210 and the components 126, 202, 206, 208 to allow the controller 210 to communicate with such components 126, 202, 206, 208 via any suitable communications protocol (e.g., CANBUS).

It should be appreciated that the controller 210 may correspond to an existing controller(s) of the implement 10 and/or the vehicle 204, itself, or the controller 210 may correspond to a separate processing device. For instance, in one embodiment, the controller 210 may form all or part of a separate plug-in module that may be installed in association with the implement 10 and/or the vehicle 204 to allow for the disclosed systems to be implemented without requiring additional software to be uploaded onto existing control devices of the implement 10 and/or the vehicle 204. It should also be appreciated that the functions of the controller 210 may be performed by a single processor-based device or may be distributed across any number of processor-based devices, in which instance such devices may be considered to form part of the controller 210. For instance, the functions of the controller 210 may be distributed across multiple application-specific controllers, such as an engine controller, a transmission controller, an implement controller, and/or the like.

Furthermore, in one embodiment, the system 200 may also include a user interface 218. More specifically, the user interface 218 may be configured to provide feedback (e.g., notifications associated with the conditions of the seedbed 116) to the operator of the implement 10 and/or vehicle 204. As such, the user interface 218 may include one or more feedback devices (not shown), such as display screens, speakers, warning lights, and/or the like, which are configured to provide feedback from the controller 210 to the operator. The user interface 218 may, in turn, be communicatively coupled to the controller 210 via the communicative link 216 to permit the feedback to be transmitted from the controller 210 to the user interface 218. In addition, some embodiments of the user interface 218 may include one or more input devices (not shown), such as touchscreens, keypads, touchpads, knobs, buttons, sliders, switches, mice, microphones, and/or the like, which are configured to receive user inputs from the operator. In one embodiment, the user interface 218 may be positioned within a cab (not shown) of the vehicle 204. However, in alternative embodiments, the user interface 218 may have any suitable configuration and/or be positioned in any other suitable location.

In several embodiments, the controller 210 may be configured to determine one or more profiles of the seedbed floor. More specifically, as indicated above, the implement 10 may include one or more seedbed detection assemblies 100 mounted on its frame 16. Each detection assembly 100 may, in turn, include a seedbed floor sensor 126 configured to detect the position of the seedbed tool 114 of the assembly 100 relative to the frame 16 (e.g., by detecting the position of the pivot arms 104, 106 relative to the frame 16), with such position generally being indicative of the profile of the seedbed floor. In this regard, the controller 210 may be configured to receive data from seedbed floor sensor(s) 126 (e.g., via the communicative link 216). Thereafter, the controller 210 may be configured to analyze/process the received data to determine one or more profiles of the seedbed floor. Each profile of the seedbed floor may, in turn, be associated with the data received from one of the seedbed floor sensor(s) 126. For instance, the controller 210 may include a look-up table(s), suitable mathematical formula, and/or algorithms stored within its memory 214 that correlates the received data to the seedbed floor profile(s).

Furthermore, in several embodiments, the controller 210 may be configured to compare the determined seedbed floor profiles to determine a differential between such profiles. For example, in one embodiment, the implement 10 may include first and second seedbed floor detection assemblies 100, with the detection assemblies 100 being spaced apart from each other along the lateral direction 24. In such embodiment, the controller 210 may be configured to determine a first seedbed profile based on data received from the seedbed floor sensor 126 of the first detection assembly 100 and a second seedbed profile based on data received from the seedbed floor sensor 126 of the second detection assembly 100. Thereafter, the controller 210 may be configured to compare the first and second seedbed floor profiles to determine a differential between the profiles. The determined differential may be indicative of a variation in the vertical profile of seedbed (e.g., the heights of the seedbed floor) at the locations of the first and second detection assemblies 100. Such a variation may, in turn, be indicative of an undulating or non-level seedbed. As such, when the differential between the first and second seedbed floor profiles exceeds a predetermined threshold, the controller 210 may be configured to initiate one or more control actions to address the differential.

It should be appreciated that the controller 210 may be configured to determine the differential between the seedbed floor profiles in any suitable manner. For example, in embodiments where the controller 210 is determining a differential between two seedbed floor profiles, the controller 210 may simply determine the difference in profiles or the positions of the corresponding pivot arms 104, 106 relative to the frame 16. However, the controller 210 may, in some embodiments, determine a differential between three or more seedbed floor profiles. In such embodiments, the controller 210 may determine an average value of the three or more profiles (or the positions of the pivot arms 104, 106 relative to the frame 16) and then determine the differential between each profile (or the position of the corresponding pivot arms 104, 106 relative to the frame 16) and the average value.

Moreover, it should be appreciated that the predetermined threshold used by the controller 210 to compare the determined seedbed floor profiles may be selected to prevent the controller 210 from initiating control action(s) when only minor differences exist between the seedbed floor profiles. In general, the seedbed floor profiles may experience minor variations throughout the field. For example, soil condition changes, rocks, field trash, and/or the like may cause minor variations in the determined seedbed floor profiles. Such minor variations may be expected and are generally not indicative of poor seedbed quality or the need to adjust an operating parameter(s) of the implement 10 and/or the vehicle 204. As such, the predetermined threshold may be a differential between the determined seedbed floor profiles that is great enough to be indicative of poor seedbed quality or the need to adjust an operating parameter(s) of the implement 10 and/or the vehicle 204.

As indicated above, in several embodiments, the controller 210 may be configured to initiate one or more control actions when the differential between determined seedbed floor profiles exceeds the predetermined threshold. In general, such control action(s) may be associated with or otherwise intended to reduce or otherwise address the determined seedbed floor profile differential. For example, in one embodiment, when the seedbed floor profile differential exceeds the predetermined threshold, the controller 210 may be configured to notify the operator of vehicle/implement 10/12 that the differential has exceeded the predetermined threshold. Specifically, in one embodiment, the controller 210 may be configured to transmit instructions to the user interface 218 (e.g., the communicative link 216) instructing the user interface 218 to provide a notification to the operator of the implement/vehicle 10/204 (e.g., by causing a visual or audible notification or indicator to be presented to the operator) indicating that the seedbed floor profile differential has exceeded the predetermined threshold. In such instances, the operator may then choose to initiate any suitable corrective action he/she believes is necessary, such as adjusting one or more operating parameters of the implement 10 and/or the associated vehicle 204.

Moreover, in several embodiments, the controller 210 may be configured to automatically adjust one or more operating parameters of the implement 10 and/or the vehicle 204 when the determined seedbed floor profile differential exceeds the predetermined threshold. Specifically, in one embodiment, the controller 210 may be configured to initiate adjustment of the penetration depth(s) of and/or down pressure being applied to the ground-penetrating tools (e.g., the disc blades 44) of the implement 10. For example, the controller 210 may be configured transmit instructions to the tool actuator(s) 202 (e.g., via the communicative link 216) instructing the actuator(s) 202 to adjust the penetration depth(s) of and/or down pressure being applied to the associated tool(s).

Furthermore, in one embodiment, the controller 210 may be configured to automatically adjust the ground speed at which the implement 10 is being moved across the field when the determined seedbed floor profile differential exceeds the predetermined threshold. Specifically, the controller 210 may be configured to transmit instructions to the engine 206 and/or the transmission 208 of the work vehicle 204 (e.g., via the communicative link 216) instructing the engine 206 and/or the transmission 208 to adjust their operation. For example, the controller 210 may instruct the engine 206 to vary its power output and/or the transmission 208 to upshift or downshift to increase or decrease the ground speed of the vehicle 204 and the implement 10 in a manner that reduces or minimizes the differential between the determined seedbed floor profiles. However, it should be appreciated that, in alternative embodiments, the controller 210 may be configured to transmit instructions to any other suitable components (e.g., braking actuators) of the vehicle 204 and/or the implement 10 such that the ground speed of the vehicle 204 and/or the implement 10 is adjusted.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for monitoring the condition of seedbed within a field, the system comprising:
    an implement frame extending along a longitudinal direction between a forward end and an aft end;
    a plurality of ground-penetrating tools supported by the implement frame adjacent to the forward end, the plurality of ground penetrating tools configured to create or be moved through a seedbed extending downwardly within the field from an outer seedbed surface to a seedbed floor;
    a plurality of surface-finishing tools supported by the implement frame adjacent to the aft end, the plurality of surface-finishing tools configured to be moved along the outer seedbed surface; and
    a plurality of ground-penetrating tools supported by the implement frame adjacent to the forward end, the plurality of ground penetrating tools configured to create or be moved through a seedbed extending downwardly within the field from an outer seedbed surface to a seedbed floor;
a plurality of surface-finishing tools supported by the implement frame adjacent to the aft end, the plurality of surface-finishing tools configured to be moved along the outer seedbed surface; and
a first seedbed floor detection assembly coupled to the implement frame such that the first seedbed floor detection assembly is located behind the plurality of ground-penetrating tools and in front of the plurality of surface-finishing tools relative to a forward travel of direction of the implement frame, the first seedbed floor detection assembly comprising:
a seedbed tool configured to ride along the seedbed floor as the implement frame is moved across the field in the forward travel direction; and
a seedbed floor sensor configured to detect a position of the seedbed tool relative to the implement frame,
wherein the position of the seedbed tool is indicative of a first profile of the seedbed floor as the seedbed tool rides along the seedbed floor with movement of the implement frame in the forward travel direction.

2. The system of claim 1, further comprising:
a second seedbed floor detection assembly coupled to the implement frame such that the second seedbed floor detection assembly is located behind the plurality of ground-penetrating tools and in front of the plurality of surface-finishing tools relative to the forward travel of direction, the second seedbed floor detection assembly comprising:
a seedbed tool configured to ride along the seedbed floor as the implement frame is moved across the field in the forward travel direction; and
a seedbed floor sensor configured to detect a position of the seedbed tool relative to the implement frame,
wherein the position of the seedbed tool is indicative of a second profile of the seedbed floor as the seedbed tool of the second seedbed floor detection assembly rides along the seedbed floor with movement of the implement frame in the forward travel direction.

3. The system of claim 2, wherein the first seedbed floor detection assembly is aligned with the second seedbed floor detection assembly along the longitudinal direction.

4. The system of claim 2, wherein the implement frame comprises a first section and a second section pivotably coupled to the first section, the first seedbed floor detection assembly mounted on the first section of the implement frame, the second seedbed floor detection assembly mounted on the second section of the implement frame.

5. The system of claim 2, further comprising:
a controller communicatively coupled to the first seedbed floor sensor and the second seedbed floor sensor, the controller configured to determine the first profile of the seedbed floor based on data received from the first seedbed floor sensor, the controller further configured to determine the second profile of the seedbed floor based on data received from the second seedbed floor sensor.

6. The system of claim 5, wherein the controller is further configured to compare the first profile of the seedbed floor to the second profile of the seedbed floor.

7. The system of claim 5, wherein, when a differential between the first profile of the seedbed floor and the second profile of the seedbed floor exceeds a predetermined threshold, the controller is configured to initiate a control action to address the differential between first profile of the seedbed floor and the second profile of the seedbed floor.

8. The system of claim 7, wherein the control action is associated with adjusting at least one of a ground speed of the implement frame, a down pressure applied through the plurality of ground-engaging tools, or a penetration depth of the plurality of ground-engaging tools.

9. The system of claim 7, wherein the control action comprises providing a notification to an operator of a work vehicle pulling the implement frame across the field.

10. The system of claim 1, wherein the plurality of ground-penetrating tools comprises a plurality of disc blades.

11. The system of claim 1, wherein the seedbed tool comprises a rotary member configured to roll along the seedbed floor as the implement frame is moved across the field in the forward travel direction.

12. The system of claim 11, wherein the rotary member comprises a disc.

13. The system of claim 1, wherein the first seedbed floor detection assembly further comprises a pivot arm pivotably coupled to the implement frame, the seedbed tool being coupled to the pivot, the seedbed floor sensor comprises a rotary sensor coupled to one of the pivot arm or the implement frame and a sensor linkage coupled between the rotary sensor and the other of the pivot arm or the implement frame.

14. The system of claim 13, further comprising a biasing mechanism coupled between the implement frame and the pivot arm, the biasing mechanism configured to bias the pivot arm away from the implement frame towards the seedbed.

15. An agricultural implement, comprising:
a frame extending along a longitudinal direction between a forward end and an aft end;
a plurality of ground-penetrating tools supported by the frame adjacent to the forward end, the plurality of ground penetrating tools configured to create or be moved through a seedbed extending downwardly within the field from an outer seedbed surface to a seedbed floor;
a plurality of surface-finishing tools supported by the frame adjacent to the aft end, the plurality of surface-finishing tools configured to be moved along the outer seedbed surface; and
a first seedbed floor detection assembly coupled to the frame such that the first seedbed floor detection assembly is located behind the plurality of ground-penetrating tools and in front of the plurality of surface-finishing tools relative to a forward travel of direction of the implement, the first seedbed floor detection assembly comprising:
a seedbed tool configured to ride along the seedbed floor as the implement is moved across the field in the forward travel direction; and
a seedbed floor sensor configured to detect a position of the seedbed tool relative to the frame,
wherein the position of the seedbed tool is indicative of a first profile of the seedbed floor as the seedbed tool rides along the seedbed floor with movement of the implement in the forward travel direction.

16. The agricultural implement of claim 15, further comprising:
a second seedbed floor detection assembly coupled to the frame such that the second seedbed floor detection assembly is located behind the plurality of ground-penetrating tool and in front of the plurality of surface-finishing tools relative to the forward travel of direction, the second seedbed floor detection assembly comprising:
- a seedbed tool configured to ride along the seedbed floor as the implement is moved across the field in the forward travel direction; and
- a seedbed floor sensor configured to detect a position of the seedbed tool relative to the frame, wherein the position of the seedbed tool is indicative of a second profile of the seedbed floor as the seedbed tool of the second seedbed floor detection assembly rides along the seedbed floor with movement of the implement in the forward travel direction.

17. The agricultural implement of claim 16, wherein the first seedbed floor detection assembly is aligned with the second seedbed floor detection assembly along the longitudinal direction.

18. The agricultural implement of claim 16, wherein the frame comprises a first section and a second section pivotably coupled to the first section, the first seedbed floor detection assembly mounted on the first section of the frame, the second seedbed floor detection assembly mounted on the second section of the frame.

19. The agricultural implement of claim 16, further comprising:
- a controller communicatively coupled to the first seedbed floor sensor and the second seedbed floor sensor, the controller configured to determine the first profile of the seedbed floor based on data received from the first seedbed floor sensor, the controller further configured to determine the second profile of the seedbed floor based on data received from the second seedbed floor sensor.

20. The agricultural implement of claim 19, wherein the controller is further configured to compare the first profile of the seedbed floor to the second profile of the seedbed floor.

* * * * *